Feb. 12, 1963   C. O. SCHMIDT, JR   3,076,996
BLEEDING CONVEYOR
Filed April 1, 1960   3 Sheets-Sheet 1

INVENTOR.
CARL OSCAR SCHMIDT, JR.
BY
Warren Kinney Jr.
ATTORNEY

Feb. 12, 1963 C. O. SCHMIDT, JR 3,076,996
BLEEDING CONVEYOR

Filed April 1, 1960 3 Sheets-Sheet 3

INVENTOR.
CARL OSCAR SCHMIDT, JR.
BY
J. Warren Kinney Jr.
ATTORNEY

United States Patent Office 3,076,996
Patented Feb. 12, 1963

3,076,996
BLEEDING CONVEYOR
Carl Oscar Schmidt, Jr., Wyoming, Ohio, assignor to The Cincinnati Butchers' Supply Company, Cincinnati, Ohio, a corporation of Ohio
Filed Apr. 1, 1960, Ser. No. 19,258
11 Claims. (Cl. 17—1)

The present invention relates to commercial slaughter equipment, in particular a bleeding conveyor. Bleeding conveyors are employed to transfer stuck animals from one processing station to another, in a production line system of meat processing. In the course of transfer, the bleeding conveyor is timed to permit a required period of bleeding in advance of scalding and dissection of the meat animal.

An object of the invention is to facilitate and expedite the slaughter of animals in a production line system of meat processing.

Another object is to minimize labor of handling meat animals in the course of processing.

A further object of the invention is to promote cleanliness and sanitation in the bleeding stage of meat processing.

Another object is to provide improved, highly serviceable apparatus for conveying animals during the bleeding process, resulting in substantial savings of labor, time and expense, as well as floor space in the packing plant.

The foregoing and other objects are attained by the means described herein and illustrated in the accompanying drawings, in which.

Figure 1:
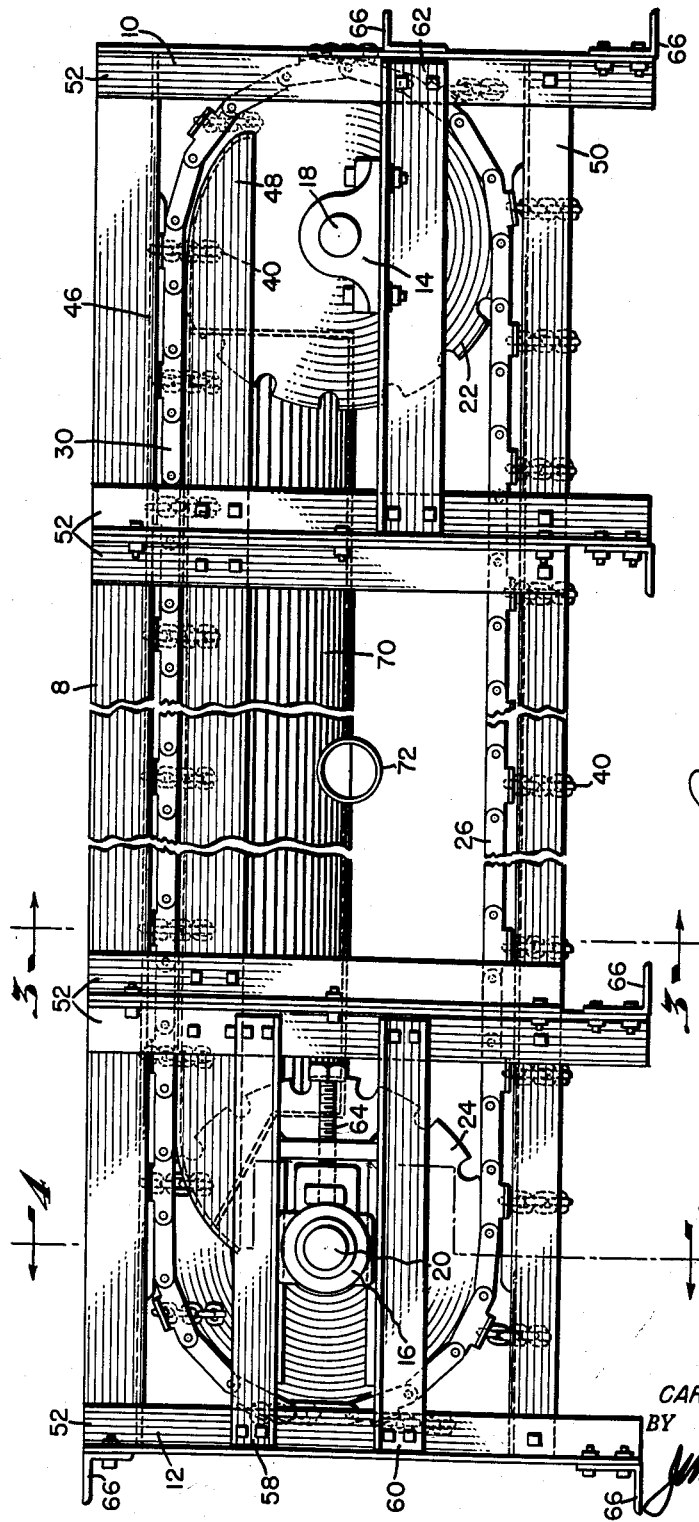
FIG. 1 is a side elevational view of the improved bleeding conveyor of the invention.
Figure 2:
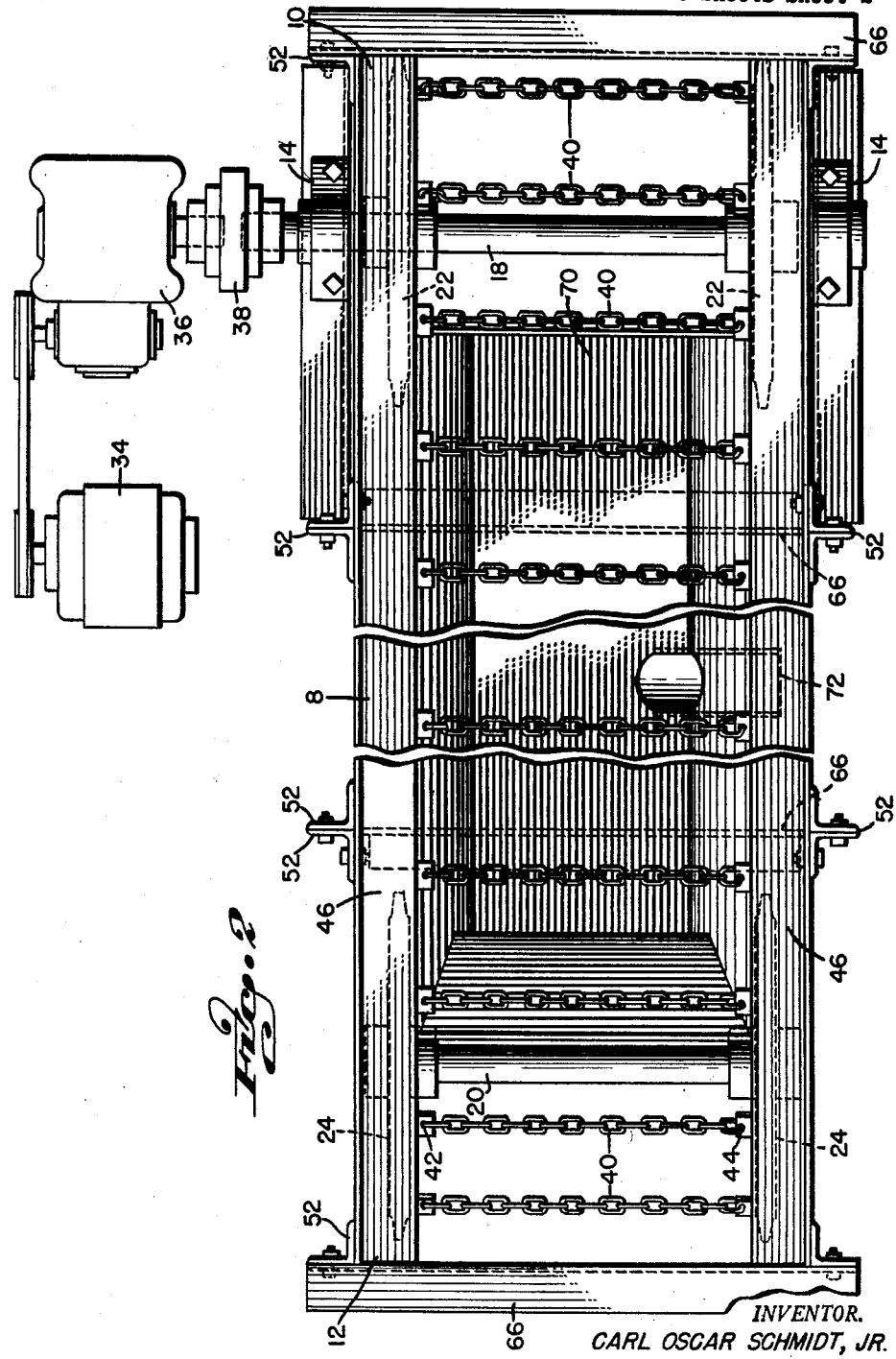
FIG. 2 is a top plan view of the same.

Referring to the drawings, 8 indicates an elongate frame having opposite end portions 10 and 12 carrying bearings 14 and 16 adapted to support the transverse shafts 18 and 20 of pairs of sprockets 22 and 24. Trained over the sprockets are the endless chains 26 and 28, the upper runs 30 and 32 of which extend lengthwise of the frame in spaced parallelism. The chains are driven in unison by the sprockets 22—22 which are fixed to shaft 18, the shaft being subject to continuous slow rotation in any suitable manner, as by means of a motor 34 driving a speed reducer 36 coupled to shaft 18 at 38.

Figure 3:
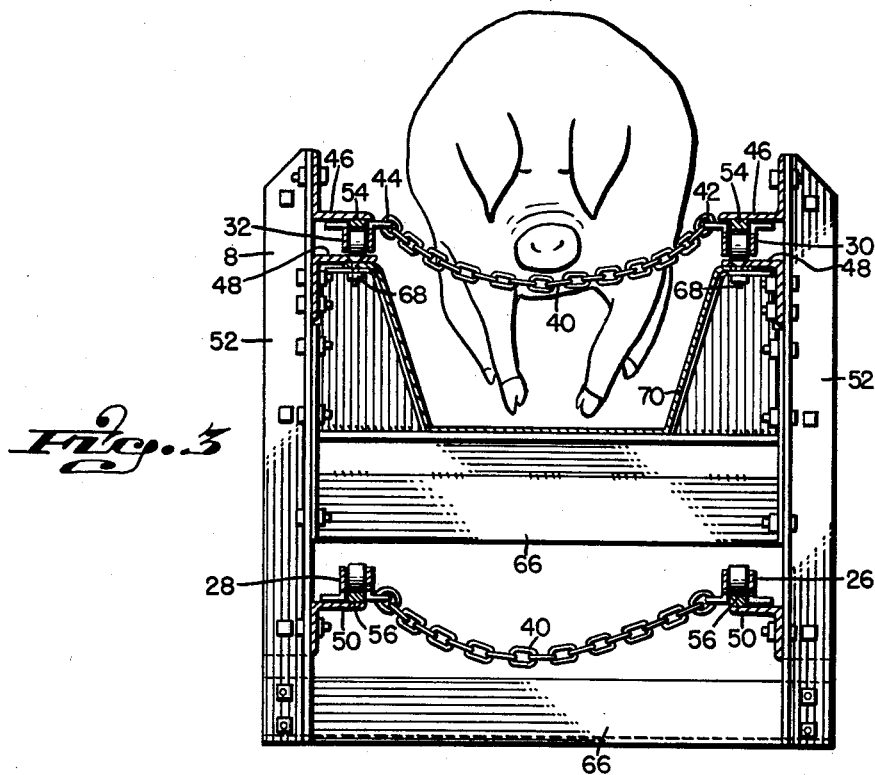
FIG. 3 is a cross-sectional view taken on line 3—3 of FIG. 1, and showing a stuck animal deposited thereon.
Figure 4:
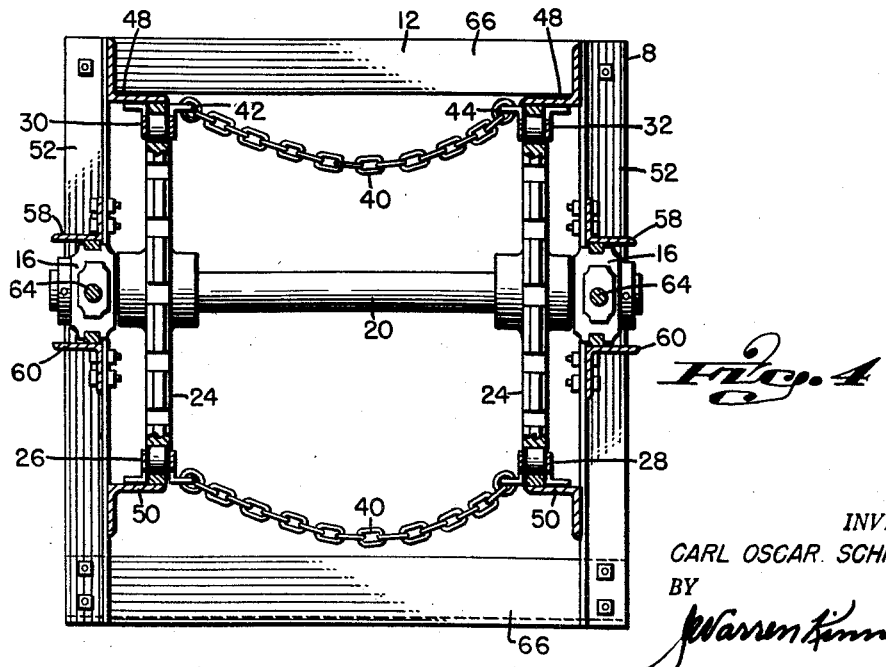
FIG. 4 is a cross-sectional view taken on line 4—4 of FIG. 1.

Spanning the chains 26 and 28 at intervals is a succession of slings 40, opposite ends 42 and 44 of which are secured to the conveyor chains at opposite sides of the conveyor frame. The slings preferably are flexible of character, and should not be too tightly stretched across the conveyor chains, for it is desirable that the slings conform to some extent with the contour of the carcass placed thereon, as suggested by FIG. 3. Heavy chains have been found to serve quite satisfactorily as slings, although flexible straps or cables might be substituted therefor. The chain slings support the carcass in the position at which it was initially placed thereon, and the links by reason of their constant movement during operation of the conveyor, are largely self-cleaning. The distance between slings should be such that several slings support the same carcass placed thereon.

The frame of the conveyor may include three pairs of horizontal rails 46, 48, 50, preferably in the form of angle irons, supported by a number of frame uprights 52 to which the rails are bolted or otherwise fixed. The rails 48 and 50 serve as tracks supporting, respectively, the upper and lower runs of the conveyor chains. Rails 46 may overlie the upper runs of the conveyors, and each such rail may carry a depending longitudinal rib 54 adapted to extend between the chain links for the purpose of maintaining a predetermined spacing between the two upper runs of the conveyor chains irrespective of any weight carried by the slings. The lower rails 50 may be equipped with similar ribs 56, to keep the lower runs in position upon the rails.

Frame members 58, 60 and 62 may be applied to the end portions of the frame sides to support the bearings 16 and 14. It may be noted that the bearings 16—16 are desirably supported between frame members 58 and 60 for adjustment lengthwise of the conveyor, adjustment screws 64 being provided for the purpose. The sides of the main frame may be maintained in spaced parallelism by means of a series of cross braces 66.

Suspended from the rails 48—48 at the bolts 68 is a longitudinal bleeding trough 70, which extends substantially the full distance between the sprocket shafts 18 and 20, for collecting blood from animals supported in movement by the slings. The trough may be provided with one or more drainage outlets 72.

In use, the bleeding conveyor is maintained in continuous operation, and at one end thereof a succession of animals is placed upon the slings following an insensitizing and sticking operation. The apparatus herein disclosed makes it possible to place the animals upon the slings without laborious turning of the animals crosswise of the direction of conveyor movement, as was common practice heretofore. Likewise, as the animals reach the discharge end of the conveyor, no turning of the carcasses is necessary in order to remove them from the conveyor and pass them on to a subsequent processing operation. The slings hold the carcasses in a prone position at all times, which assures maximum bleeding in such manner as to prevent undesirable splattering of blood around and about the conveyor apparatus, so that clean and sanitary conditions may prevail at all times.

Use of the apparatus in practice has substantially reduced the labor involved in handling animals undergoing slaughtering, and has contributed very materially to the maintenance of an orderly and sanitary procedure within the packing plant. The work of slaughtering thereby has been rendered much cleaner and more attractive to workers in the industry, as working conditions have been desirably improved thereby.

It is to be understood that various modifications and changes in the structural details of the apparatus may be made, within the scope of the appended claims, without departing from the spirit of the invention.

What is claimed is:

1. Slaughter apparatus for the processing of meat animals, comprising in combination, a pair of spaced parallel conveyor runs movable in unison in a common direction, a series of flexible slings spanning the conveyor runs and movable therewith to advance a stuck animal placed on the slings lengthwise of the conveyor runs, said slings being closely spaced one relative to another whereby a succession of slings support a single animal, the slings each being of a greater length than the distance between the conveyor runs, so that the slings sag between said conveyor runs and assume part of the contour of the animal supported thereon.

2. Slaughter apparatus for the processing of meat animals, comprising in combination, a conveyor movable in one direction, a series of flexible slings arranged transversely of the conveyor and movable therewith to advance a stuck animal placed on the slings lengthwise of the conveyor travel, said slings being closely spaced one relative to another whereby a succession of slings support a single animal, the slings being so supported by the conveyor as to sag intermediate their ends for assuming part of the contour of the animal supported thereon, and an elongate bleeding trough disposed lengthwise of the conveyor and beneath the slings approximately midway between the ends of the slings.

3. Slaughter apparatus as set forth in claim 2, wherein the slings are constituted of swinging chains spanning the bleeding trough.

4. Slaughter apparatus for the processing of meat animals, comprising in combination, a pair of spaced parallel conveyor runs movable in unison in a common direction, a series of flexible chains swingingly spanning the conveyor runs and movable with the latter to advance a stuck animal placed upon the chains lengthwise of the conveyor runs, said chains being closely spaced one relative to another whereby a succession of chains support a single animal, the chains being each of greater length than the distance between the conveyor runs so that the chains sag and assume part of the contour of the animal supported thereon.

5. Slaughter apparatus for the processing of meat animals, comprising in combination, a pair of spaced parallel conveyor runs movable in unison in a common direction, a series of flexible chains spanning the conveyor runs and movable with the latter to advance a stuck animal placed transversely of and upon the chains lengthwise of the conveyor runs, said chains being closely spaced one relative to another whereby a succession of chains support a single animal, the chains being each of greater length than the distance between the conveyor runs so as to sag and assume part of the contour of the animal supported thereon, and an elongate bleeding trough disposed beneath the succession of chains and intermediate the conveyor runs.

6. Slaughter apparatus as set forth in claim 5, wherein each chain is of a length approximating the width of an animal supported thereon.

7. Slaughter apparatus for the processing of meat animals, comprising in combination, a conveyor movable in one direction, a series of flexible swinging chains arranged transversely of the conveyor and movable therewith to advance a stuck animal placed upon the chains lengthwise of the conveyor travel, said chains being closely spaced one relative to another so that a succession of chains support a single animal, the chains being so suspended by the conveyor as to sag intermediate their ends for assuming part of the contour of the animal supported thereon.

8. Slaughter apparatus as set forth in claim 7, wherein the combination includes an elongate bleeding trough disposed beneath the chains and extending in the direction of travel of the conveyor.

9. Slaughter apparatus for the processing of meat animals, comprising in combination, a pair of spaced parallel conveyor runs movable in unison in a common direction, a series of transverse slings spanning the space between the conveyor runs and movable therewith to advance a stuck animal placed on the slings lengthwise of the conveyor runs, said slings being movable both transversely and longitudinally of and relative to the conveyor runs for self adjustment to the body of an animal thereon whereby an animal lying prone on and across the slings may have its legs hanging freely downwardly and the conveyor runs being spaced apart a distance exceeding the width of the animal.

10. Slaughter apparatus for the processing of meat animals, comprising in combination, a pair of spaced parallel conveyor runs movable in unison in a common direction, a series of flexible slings spanning the space between the conveyor runs and movable therewith to advance a stuck animal placed on the slings lengthwise of the conveyor runs, said slings being loosely pivotally attached at the ends thereof to the conveyor runs for free swinging in the direction of movement of the conveyor runs whereby the body of an animal may be placed prone on and supported by two or more slings in such a manner that the legs hang or dangle freely in a downward direction from the body of the animal, and the conveyor runs being spaced apart a distance exceeding the width of the animal.

11. The invention according to claim 10 with an elongate bleeding trough disposed beneath the slings and intermediate the conveyor runs, for collecting blood from the stuck animal during movement of the conveyor runs.

References Cited in the file of this patent

UNITED STATES PATENTS

| | | |
|---|---|---|
| 1,586,686 | Mongrain | June 1, 1926 |
| 1,739,436 | Becher | Dec. 10, 1929 |
| 2,017,046 | Hanna et al. | Oct. 15, 1935 |
| 2,841,817 | Murphy | July 8, 1958 |